RADIOACTIVE SOURCE MOVEMENT APPARATUS

Filed Nov. 30, 1961

INVENTOR.
Alexander E. Aikens, Jr.
BY
[signature]
ATTORNEY 3,159,748

RADIOACTIVE SOURCE MOVEMENT APPARATUS

Alexander E. Aikens, Jr., Philadelphia, Pa., assignor to The Budd Company, Philadelphia, Pa., a corporation of Pennsylvania Filed Nov. 30, 1961, Ser. No. 155,936
9 Claims. (Cl. 250—106)

This invention pertains to apparatus for moving radioactive sources and more particularly to apparatus for moving a radioactive source from one position to another in a shielding environment having minimum effect upon shielding integrity.

Although there are many applications in radiology where it is necessary to translate a radioactive source, a specific example is that of radiography where a shielding geometry is provided with a bent channel extending between access ports along a circuitous path past a storage position surrounded in all directions by shielding material and an exposure position aligned with a collimating aperture in the shielding material. Such a channel, or at least those sections of the channel through which the source is moved, must have internal dimensions somewhat greater than the external dimensions of the source and the source is usually translated by means of a cable or flexible push rod. The extent of the channel is devoid of shielding material and represents a discontinuity in the attenuation of undesirable radiation.

Therefore, it is an object of this invention to provide source handling means including source movement apparatus which is economical, safe, and has minimum effect upon shielding integrity.

A more specific object is to provide apparatus for moving radioactive sources through path defining channels whereby nearly the entire volume of the channels remains filled with shielding material.

According to an illustrated aspect of this invention, the means for moving a radioactive source through a channel having internal dimensions determined by the external dimensions of the source for free passage of the source therethrough comprises a series of generally spherical shielding material elements having substantially the same external diameter as the source, the spherical elements being in contacting sequence within the channel at both sides of the source and extending through the channel for the length along which shielding integrity is to be preserved.

A better understanding of this invention will be had, together with additional objects and advantages, upon consideration of the detailed specification taken in conjunction with the accompanying drawing wherein.

Figures 1, 2:
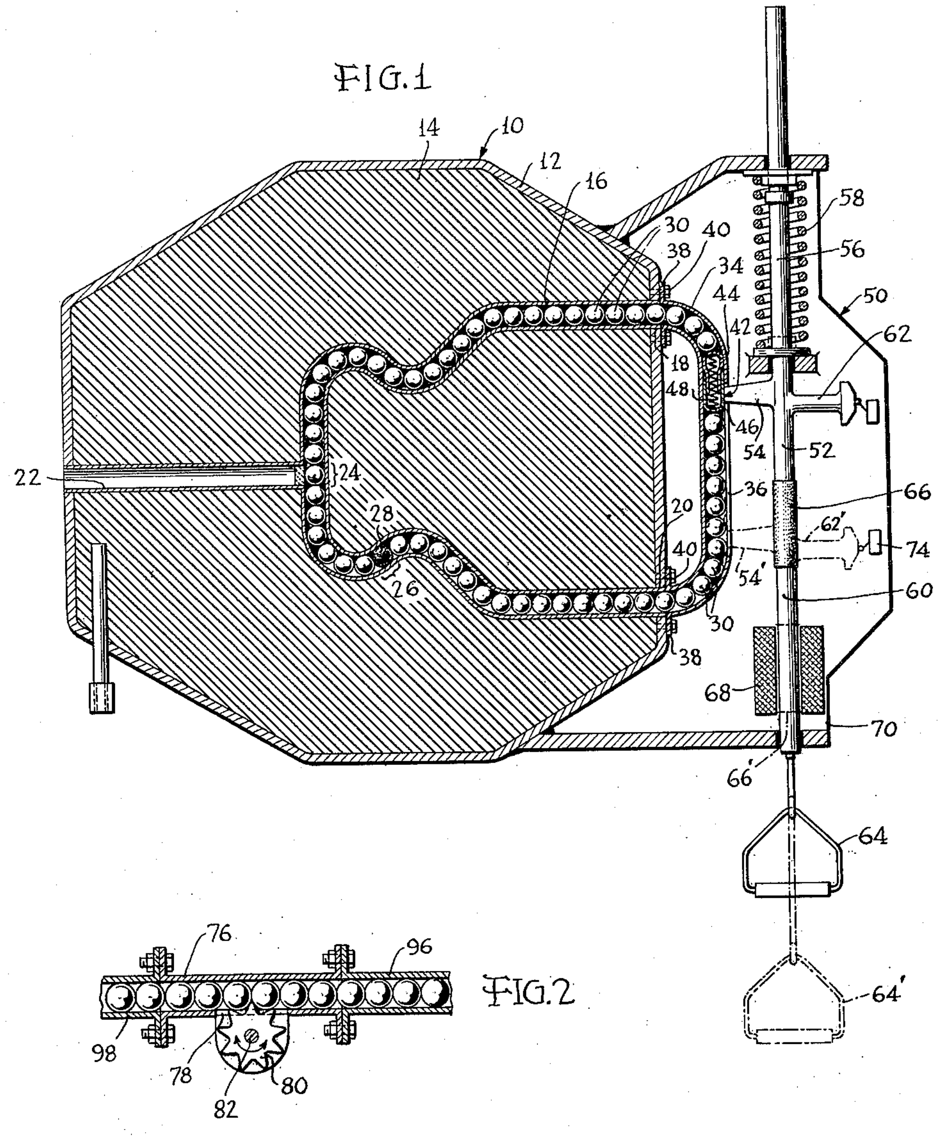
FIG. 1 is a cross section illustration of a radiography apparatus embodying the preferred source handling system of this invention.
FIG. 2 illustrates an alternative source movement apparatus.

In the FIG. 1 illustration the radiography geometry 10 includes a housing 12 of a material such as stainless steel which provides mechanical protection and defines a shielding material configuration 14 such as of lead or the like selected for its efficiency in attenuating the high energy gamma radiation of radiography sources. A circuitous channel 16, cast into lead shield 14, extends between access ports 18 and 20 in a circuitous path designed to allow shielding material to be interposed efficiently between any internal channel portion and the exterior of housing 14. A collimating aperture 22 extends from channel 16 at exposure position 24 to the exterior of the radiography device 10. In addition, there is a defined storage position at 26 which is surrounded in every direction by a safe minimum of shielding material. A radio active source 28, shown at storage position 26, is to be reciprocated between storage position 26 and exposure position 24. In accordance with the teachings of this invention, the channel is filled with a plurality of Source Translation elements 32 which are substantially spherical with radii only slightly less than the internal radius of channel 16. The radial play should be the minimum required for free translation of elements 32. A generally spherical shape is preferably prescribed for source 28, but other configurations which will pass freely through the channel 16 may be employed.

Conventionally, the entire volume of channel 16 has represented a void in otherwise integral shielding. According to this invention, however, the maximum void required is but a small fraction of the channel volume. The remaining void volume is made up of the differences between the volumes of the spheres and their circumscribed cylinders. An integrity factor may be defined as follows:

$$\text{I.F.} = (V_e/V_c)(D_e/D_s)100\% \qquad (I)$$

where $V_e$ and $V_c$ are the respective volumes of the translation element and of the circumscribed cylinder, and $D_e$ and $D_s$ represent attenuations of the translation element and shielding element materials. For most practical shielding materials, the metals, attenuation for gamma radiation depends upon density.

Assuming the materials of spherical elements 30 and of shield 14 to be the same, the integrity factor becomes:

$$\text{I.F.} = (1.33\pi r^3 / 2\pi r^3)100\% = 67\% \qquad (II)$$

While the most economic gamma shielding material for larger volumes is lead, other more dense and hence more effective shielding materials such as uranium, tungsten, and other lead alloys are economic for small volumes. These so called heavy metals may, therefore, comprise the material of elements 30 and the density ratio factor of Equation I may be increased to nearly 1.5 resulting in an integrity factor approaching 100%. It is not necessary, however, that the attenuation of elements 30 approaches or exceeds that of shield 14. Immediate improvement is gained upon the addition of even the lightest materials to the otherwise void volume of channel 16. Not only is direct radiation attenuation improved, but, scattered radiation is very nearly completely stopped.

In addition to the improvement of shielding integrity, concomitant advantages of the generally spherical linkage include positive source positioning, backlash elimination, subsantially frictionless motion, and a continuous range of selectable source positions. In addition, it is the compressive strength of the spherical linkage elements 30 which determines the ruggedness of the system, obviously greater than the tensile strength of a flexible cable.

The preferred source movement apparatus of FIG. 1 further includes a reentry channel portion 34 provided with a longitudinal slot 36 and secured to housing 12 in alignment with ports 18 and 20 by means of flanges 38 and bolts 40. A plunger 42 is arranged for translation along channel portion 34 and provided with a first end cap 44 urged away from a second fixed end cap 46 by spring 48. The remainder of reentry channel portion 34 is filled with additional spherical elements 30 and the spring-cap plunger arrangement corrects for total channel path lengths differing from an integral number of spherical element diameters. The longitudinal slot 36 allows access to plunger 42 for translation of the latter between positions corresponding to location of source 28 at storage position 26 and at exposure position 24.

The system is completed by a remotely operable fail-safe positioning mechanism 50. Its elements include a cruciform toggle 52 having a first arm 54 attached to plunger 42, a second arm 56 linked with tension spring 58, a third arm 60 for external manual or automatic translation; and a fourth arm 62 for position indicator actuation. An externally accessible stirrup 64 allows convenient application of a force in opposition to the restoring force generated by spring 58. Toggle arm 60 is provided with a solenoid keeper 66 of magnetic material which cooperates with a solenoid 68 attached to bracket 70. Manual motion of stirrup 64 downward moves keeper 66 into the field of solenoid 68 whereupon this position is maintained during the time a suitable current is supplied to solenoid 68. Failure or disruption of the solenoid current allows tension spring 58 to return the system to the safe or storage condition.

Source positions may be indicated by means of limit switches 72 and 74 actuated by toggle arm 62 to allow for control of the electrical position indicator auxiliaries.

FIGURE 2 illustrates an alternative drive means wherein a channel section 76 is provided with a longitudinal slot 78 allowing a ball chain gear 80 to be meshed directly with spheres 30'. Rotation of gear 80 about its axis 82 results in translation of the spherical linkage.

Figure 3:
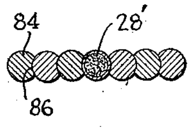
FIG. 3 illustrates a modification of the source translation elements of FIG. 1.
Figure 4:
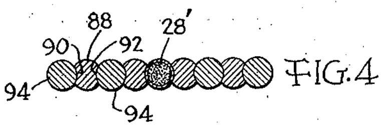
FIG. 4 illustrates another alternative configuration for the source translation elements.

It is intended in this specification that spherical linkage, spherical elements and like terms be given the interpretation which includes substantially equivalent geometric shapes such as those illustrated in FIGURES 3 and 4 in contacting sequence with a source 28'. In FIGURE 3 each of the linkage elements 84 is provided with a spherical concavity 86 to mate with the convex portion of its neighbor. In FIGURE 4 alternate linkage elements 88 are provided with opposed concavities 90, 92 and arranged in sequence with interposed spherical linkage elements 94. The result of both of these modifications of the basic spherical linkage is to increase further the shielding integrity by geometric modification to approach the optimum integrity factor of 100%.

It will be realized that the disclosed apparatus and system are susceptible to various modifications and extensions. As indicated in FIG. 2, the driving means channel portion 76 may be coupled with additional channel portions as at 96 and 98 which lead, for example, between a shipping container and a geometry such as shown in FIG. 1 for original loading or for exchange of sources.

Having now describd the invention in specific detail and exemplified the manner in which it may be carried into practice, it will be readily apparent to those skilled in the art that innumerable variations, modifications, applications, and extensions of the basic principles involved may be made without departing from its spirit and scope.

What is claimed is:

1. Linkage means for bidirectionally translating a generally spherical radioactive source through a channel of circular cross section extending through a shielding material geometry, said linkage means comprising a series extending in both directions from the source to the exterior of the geometry of generally spherical contacting elements of shielding material having radii substantially equal to the radii of the channel and of the source, said elements contacting the source at opposite sides of the source in the channel, and means selectively pushing the source forward and backward through the channel solely by the transfer of compressive forces.

2. The linkage means of claim 1 wherein said elements are spheres.

3. The linkage means of claim 1 wherein first alternate elements in said series are spheres and second alternate elements interposed between pairs of spheres have two opposed symmetrical concavities mating with said spheres.

4. The linkage means of claim 1 wherein each of said elements has a concavity mating with the spherical surface of the next element in said series.

5. The linkage means of claim 1 wherein the material of said elements is more dense and provides greater radiation attenuation than the material of the geometry.

6. A radiography device comprising a shielding material geometry having a circuitous channel of circular cross section extending therethrough, a generally spherical radioactive source within and freely translatable through said channel, source translation linkage means in said channel extending in both directions from contact with said source to the exterior of the geometry, said linkage means comprising a series of generally spherical contacting elements of shielding material substantially filling said channel, and reciprocatable means translating said linkage means through said channel solely by the transfer of compressive forces.

7. The device of claim 6 wherein said reciprocatable means comprises a plunger interposed in said series.

8. The device of claim 6 wherein said reciprocatable means comprises a ball chain gear meshed with said elements.

9. A system for controlled exposure of a radioactive source, which system comprises: a radiation attenuation shield, a source translation linkage, and a fail-safe linkage reciprocating mechanism, said shield including a housing, a shielding material geometry within said housing having a first circuitous channel portion of circular cross section extending therethrough past a storage position surrounded in every direction by a safe minimum of shielding material and an exposure position, said geometry being shaped to define a collimating aperture extending from said exposure position, a generally spherical radioactive source within said channel and freely translatable therethrough, said linkage means comprising a series of generally spherical contacting elements of shielding material extending in both directions from contact with said source and substantially filling said channel, said mechanism including a second reentry channel portion coupled with said first channel portion and shaped to define a longitudinal access slot; a cylindrical plunger within said longitudinal section and additional said elements substantially filling said second channel portion and contacting said plunger and the elements of said series, a toggle coupled with said plunger, spring means coupled with said toggle urging said toggle and said plunger to a first position in which said source is at said storage position, manually operable means connected to said toggle moving said toggle and said plunger to a second position at which said source is at said exposure position, and an electromagnetic means, maintaining during uninterrupted current supplied thereto, said toggle in said second position.

References Cited by the Examiner

UNITED STATES PATENTS

| | | | |
|---|---|---|---|
| Re. 24,544 | 9/58 | Morganstern | 250—106 X |
| 2,776,047 | 1/57 | Howard | 198—232 |
| 2,817,703 | 12/57 | Naxon | 198—213 X |
| 3,032,661 | 5/62 | Wolf | 250—106 X |

RALPH G. NILSON, *Primary Examiner.*

ARCHIE R. BORCHELT, *Examiner.*